(12) United States Patent
Luo et al.

(10) Patent No.: US 7,747,958 B2
(45) Date of Patent: Jun. 29, 2010

(54) SYSTEM AND METHOD FOR ENABLING ASSISTED VISUAL DEVELOPMENT OF WORKFLOW FOR APPLICATION TASKS

(75) Inventors: Zhong Hai Luo, Etobicoke (CA); Bryan R. Goring, Milton (CA); Michael Shenfield, Richmond Hill (CA)

(73) Assignee: Research In Motion Limited, Waterloo, Ontario (CA)

( * ) Notice: Subject to any disclaimer, the term of this patent is extended or adjusted under 35 U.S.C. 154(b) by 596 days.

(21) Appl. No.: 11/250,427

(22) Filed: Oct. 17, 2005

(65) Prior Publication Data

US 2006/0236304 A1 Oct. 19, 2006

Related U.S. Application Data

(60) Provisional application No. 60/672,093, filed on Apr. 18, 2005.

(51) Int. Cl.
*G06F 3/00* (2006.01)
*G06F 3/14* (2006.01)
*G06F 9/44* (2006.01)

(52) U.S. Cl. ............ 715/762; 715/864; 717/106
(58) Field of Classification Search .......... 715/762, 715/763, 804, 864, 769, 770; 717/106, 109, 717/100, 113
See application file for complete search history.

(56) References Cited

U.S. PATENT DOCUMENTS

| | | | |
|---|---|---|---|
| 5,187,788 A | 2/1993 | Marmelstein | |
| 6,233,726 B1* | 5/2001 | Bowman et al. | 717/107 |
| 6,263,486 B1* | 7/2001 | Boezeman et al. | 717/108 |
| 6,564,368 B1* | 5/2003 | Beckett et al. | 717/113 |
| 6,806,890 B2* | 10/2004 | Audleman et al. | 715/762 |
| 6,823,495 B1* | 11/2004 | Vedula et al. | 715/805 |
| 6,839,714 B2* | 1/2005 | Wheeler et al. | 707/102 |
| 7,197,041 B1* | 3/2007 | Tyebji | 370/401 |
| 2002/0010908 A1 | 1/2002 | Cheng et al. | |
| 2002/0184610 A1 | 12/2002 | Chong et al. | |
| 2003/0149958 A1 | 8/2003 | Baluja et al. | |
| 2004/0153992 A1 | 8/2004 | Molina-Moreno et al. | |
| 2004/0215700 A1 | 10/2004 | Shenfield et al. | |
| 2005/0005270 A1* | 1/2005 | Bucher et al. | 717/173 |

FOREIGN PATENT DOCUMENTS

CA 2436580 8/2002

\* cited by examiner

*Primary Examiner*—Kieu Vu
*Assistant Examiner*—Blaine T. Basom (57) ABSTRACT

A method of enabling assisted visual development of workflow for an application task. A workflow wizard provides a tasking page from which a user selects a desired one of a plurality of candidate tasks. The workflow wizard then provides a data selection page from which the user selects a desired set of data components from a plurality of candidate data components. A target selection page is then provided, from which the user can select a desired one of a plurality of candidate objects. Finally, an assignment page is provided, to enable the user to specify a detailed assignment relationship between the selected set of data components and fields of the selected target. The workflow wizard then auto-generates code that, when executed, will implement the selected task using the selected set of data components, the selected target and the specified assignment.

15 Claims, 8 Drawing Sheets

SYSTEM AND METHOD FOR ENABLING ASSISTED VISUAL DEVELOPMENT OF WORKFLOW FOR APPLICATION TASKS

CROSS-REFERENCE TO RELATED APPLICATIONS

The present application claims priority under 35 U.S.C. 119(e) from U.S. Provisional Patent Application Ser. No. 60/672,093 filed Apr. 18, 2005.

TECHNICAL FIELD

The present invention relates generally to wireless communications and, in particular, to a method and system for enabling assisted visual development of workflows for tasks that are executed on applications running on wireless devices.

BACKGROUND OF THE INVENTION

The number and variety of wireless terminal devices, such as mobile telephones, wireless-enabled laptop computers and PDAs (Personal Digital Assistants) with wireless communication capabilities, self-service kiosks and two-way pagers are rapidly increasing. Software applications which run on these devices increase their utility. For example, a mobile phone may include an application which retrieves the weather for a range of cities, or a PDA may include an application that allows a user to shop for groceries. These software applications take advantage of wireless connectivity to a data network (such as the Internet) in order to provide timely and useful services to users.

A typical wireless application may include more than twenty separate tasks (or "actions") each involving several steps. Traditionally, software developers have had to manually create action codes to perform each required task, i.e. programmers have had to manually code all of the steps, procedures and functions needed to perform the task. This prior-art approach is time-consuming and furthermore requires significant time and effort to debug the code for minor misspellings, syntax errors, problematic variable definitions or other logical inconsistencies. As programmers end up devoting time and energy to coding mechanics and syntax, they inevitably do not concentrate fully on the design and programming of the workflow of the task, i.e. the conceptual steps needed to perform the task.

Accordingly, it would be highly desirable to provide a method and system for assisted visual development of workflow for application tasks.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENT

The present invention provides methods and systems for enabling assisted visual development of workflow for an application task.

An object of the present invention is to provide a method and system for assisted visual development of workflow for application tasks.

Thus, an aspect of the present invention provides a method of enabling assisted visual development of workflow for an application action. The method includes the step of providing an action page from which a user can select a desired one of a plurality of candidate actions. The method also includes the step of providing a data selection page from which the user can select a desired set of data components from a plurality of candidate data components. The method also includes the step of providing a target selection page from which the user can select a desired one of a plurality of candidate objects. The method also includes the step of providing an assignment page adapted to enable the user to assign the selected set of data components to fields of the selected object. The method further includes the step of automatically generating one or more action codes to implement the selected action using the selected set of data components and the assigned fields of the selected object.

Another aspect of the present invention provides a system for visually assisting an application developer with development of workflow for an application task. The system includes a computing device for exchanging data with a data network whereby an update of a wireless application can be uploaded to an application gateway that mediates between the data network and a wireless network serving a plurality of wireless devices to thus enable the wireless devices to download the update. The system also includes an application development environment (ADE) running on the computing device, the ADE including a workflow wizard for visually assisting the application developer with the development of workflow that defines the steps for executing the application task, the ADE including a plurality of graphically presented options for viewing and selecting data options, viewing and selecting object options, assigning the selected data to the selected object, whereby the ADE visually guides the application developer through the creation of workflow and then automatically generates code for executing the task defined by the workflow.

Yet another aspect of the present invention provides a method of visually assisting with programming of workflow for an application task. The method includes the steps of providing an action page from which a user can select a desired one of a plurality of candidate actions; providing a data selection page from which the user can select a desired set of data components from a plurality of candidate data components; providing a target selection page from which the user can select a desired one of a plurality of candidate objects; providing an assignment page to enable the user to assign the selected set of data components to fields of the selected object; and automatically generating code to execute the task using the selected set of data components and the fields of the selected object.

Accordingly, the methods and system of the present invention visually assist the application developer with the workflow of an application task by graphically presenting options on sequential pages (or windows or dialog boxes). These sequential pages prompt the application developer to choose from selections of candidate actions, candidate data components, and candidate targets. The present invention thus guides the application developer through the various steps needed to define the workflow of the task. Once the application developer has selected the desired data components and the desired targets and has then specified a detailed assignment of the selected data components onto the selected target, the code for executing the task is then automatically generated. In one embodiment, the present invention provides a workflow wizard which coordinates the sequence in which the data selection, target selection and assignment pages prompt the application developer. In one embodiment, the workflow wizard intelligently filters out selectable targets in the target selection page depending on the type of data components that are selected in the data selection page.

"Workflow" is a term of art used to describe the steps taken during the execution of a task. For example, in order to perform the task (or "action") of reporting current weather information on a terminal device, an application performs the following steps: firstly, the terminal device sends a request message to a weather service server; secondly, the terminal device receives a response from the weather service server; and finally the terminal device displays the result on the terminal device's graphical user interface (GUI). These three steps constitute the workflow of the task. As exemplified by the foregoing example, workflow provides a conceptual, high-level roadmap that defines in broad procedural terms the various processes or steps that need to be followed to implement the task, that is, what work must be performed and how that work "flows" or interacts with other procedures or steps of the task.

In general, and as will be elaborated in greater detail below, the present invention provides methods and systems that visually assist application developers (or programmers) with development of workflow for an application task by graphically presenting options on sequential pages, windows or dialog boxes from which the application developer can select (i) data components from a collection of candidate data components and (ii) a target from a collection of candidate objects. The method and system of the present invention subsequently enables the application developer to assign the selected data components to the selected target and then code auto-generates code for implementing the task. In a preferred embodiment, as will be elaborated below, a workflow wizard coordinates the sequence of pages and responds intelligently to the selections made by the application developer by filtering out incompatible objects so as to facilitate the development of workflow for the application task. This invention therefore allows the application developer to focus his time and energy on the design of workflow and application logic without becoming distracted by the minutiae of writing and debugging code. The automatically-generated code will generally be efficient code that requires little or no debugging by the application developer, which further reduces the time and cost of application development. Therefore, this invention greatly facilitates the development or programming of application tasks for wireless applications as well as any other (i.e. non-wireless) software applications.

Figure 1:
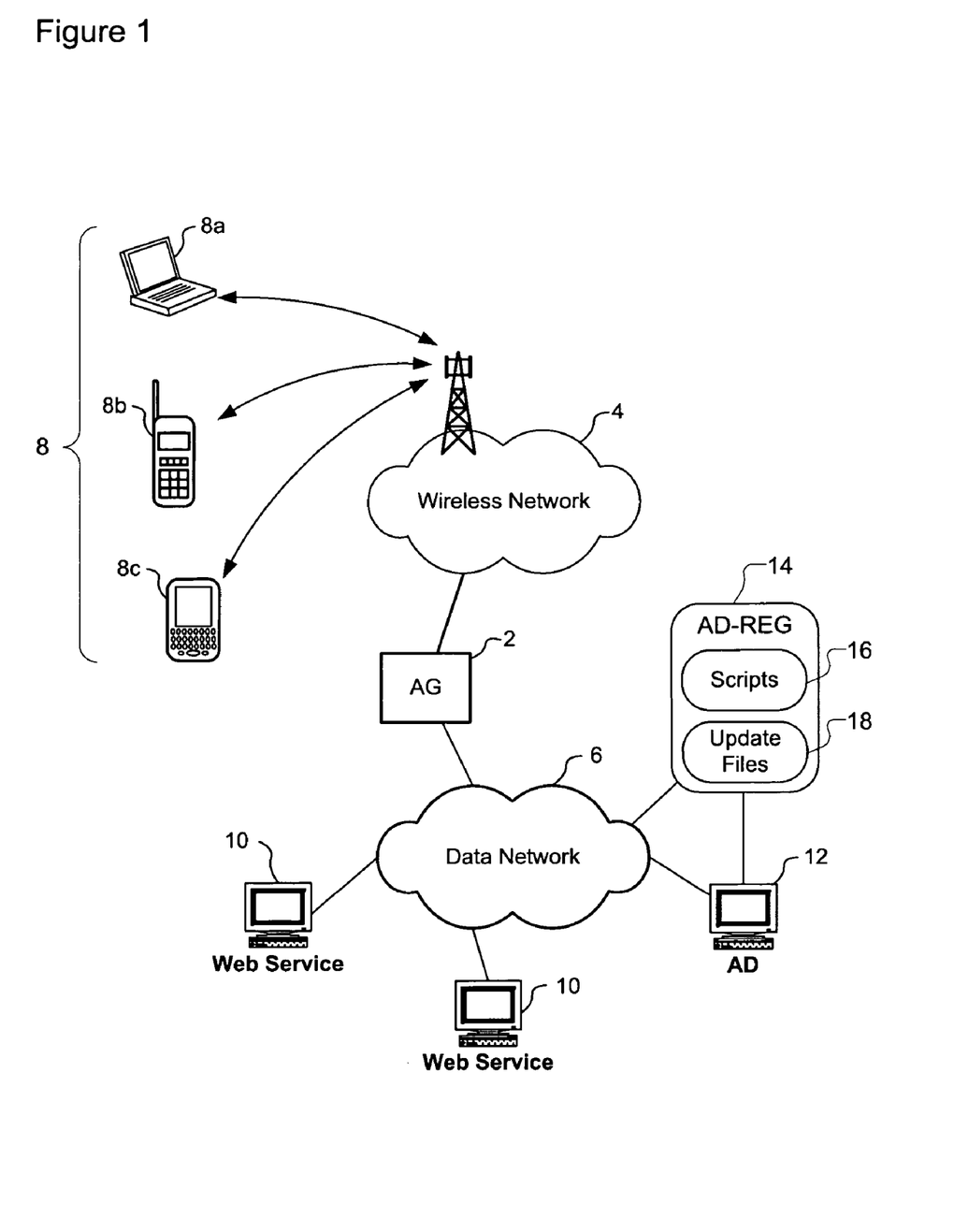
FIG. 1 is a block diagram schematically illustrating a network in which the present invention may be deployed.

Referring to FIG. 1, a network facilitating the use of software-driven wireless terminal devices generally includes an Application Gateway (AG) 2 coupled between a wireless network 4 and a data network 6 such as, for example, the Internet. In other words, the AG mediates data traffic flow between the wireless network 4 and the data network 6. As further illustrated in FIG. 1, a plurality of wireless terminal devices 8 are coupled to the wireless network 4 and are thus hosted by the AG 2. Therefore, the AG 2 generally operates to mediate message flows between the terminal devices 8 and a plurality of web services 10 (also known as data services) which are accessible through the data network 6 in the manner described in Applicant's co-pending United States Patent Publications Nos. 2004/0215700 and 2004/0220998, both of which are incorporated herein by reference.

In general, the terminal devices 8 can be any of a wide variety of software-controlled wireless devices including but not limited to wireless-enabled laptop computers 8a, mobile/cellular telephones 8b, PDAs 8c with wireless communication capabilities, self-service kiosks and two-way pagers. As is well known in the art, such devices generally include a microprocessor which operates under software control to provide the functionality of the terminal device 8.

As described in Applicant's co-pending United States Patent Publications Nos. 2004/0215700 and 2004/0220998, operation of the AG 2 enables a wireless application executing in a terminal device 8 to communicate with web services 10 offered through the data network 6. This operation may, for example, include the accessing of HTML content, and the downloading of files from back-end data sources connected to the data network 6. In order to reduce device resource requirements, each wireless application provides User Interface (UI) functionality (for both display and user input) appropriate to the capabilities of the particular terminal device 8. At least a portion of the application logic is executed on the AG 2, so that signalling between the AG 2 and the terminal device 8 is limited to downloading application data for local storage and display on the terminal device 8, and uploading user inputs. The application logic executing on the AG 2 communicates with a web service 10 or a back-end data source on the data network 6 in response to the user input received from the terminal device 8 to provide the functionality of a wireless application. This arrangement enables a user of the terminal device 8 to access and use the web service 10, but with reduced signalling traffic to and from the terminal device 8 to thereby limit wireless network bandwidth and device resource requirements.

Periodically, as is known in the art, wireless applications are updated and a newer version is released, for example to provide improved functionality or to eliminate a bug in the source code. An application developer (AD) 12 connected to the data network 6 can produce an updated version of a wireless application for remote dissemination to the wireless terminal devices via the data network 6, AG 2 and the wireless network 4. Remote updating of wireless applications can be accomplished by uploading scripts 16 and update files 18 for an application update to a web-accessible server or "application development registry" (AD-REG) 14. The AD 12 will concurrently publish an indication that the updated version of the application is now available so that the wireless devices 8 are made aware that an updated version of the application is now available. The terminal devices 8 then download the scripts 16 and update files 18 from the AD-REG 14.

Traditionally, in order to update a wireless application or to create a new release of a wireless application, a software developer or programmer has to expend plenty of time and energy in coding, testing and debugging source code for the application. As is well known in the art, application developers typically use an application development environment (ADE) to code, test, and debug application software. Therefore, in order to facilitate and expedite application development, the present invention provides a method and system for visually assisting an application developer with development of workflow for an application task.

In general terms, the method includes providing sequentially (i) a task page from which a user can select a desired one of a plurality of candidate tasks; (ii) a data selection page from which the user can select a desired set of data components from a plurality of candidate data components; (iii) a target selection page from which the user can select a desired one of a plurality of candidate objects; (iv) an assignment page to enable the user to specify a detailed assignment relationship between the selected set of data components and fields of the selected target from which code is automatically generated that executes the task using the selected set of data components, the selected target and the specified assignment.

In general terms, the system includes a computing device for exchanging data with a data network whereby an update of a wireless application can be uploaded to an application gateway that mediates between the data network and a wireless network serving a plurality of wireless devices to thus enable the wireless devices to download the update. The system also includes an application development environment (ADE) running on the computing device, the ADE including a workflow wizard for visually assisting the application developer with the development of workflow that defines the steps for executing the application task, the ADE including a plurality of graphically presented options for viewing and selecting data options, viewing and selecting target options, assigning the selected data to the selected target, whereby the ADE visually guides the application developer through the creation of workflow and then automatically generates code for executing the task defined by the workflow.

Preferred embodiments of the present invention provide an ADE that includes a "workflow wizard", which will be described in detail in the following paragraphs. The workflow wizard provides application developers with a powerful visual tool to facilitate the development process of workflow. This workflow wizard enables the application developer to focus on application logic without worrying about the underlying codes. As is known in the art, the term "wizard" means an interactive computer program acting as an interface to lead a user, or in this case an application developer, through a series of steps, typically using a sequence of dialog boxes that present options and prompt the user to make choices from those options.

Using this workflow wizard, application developers can easily define any desired actions or tasks for buttons and menu-items, such as sending messages, transferring data to another screen, and launching scripts, and then design the flow of work for implementing the task, after which the wizard auto-generates the code that accomplishes this task.

When software developers define an action for a button and/or menu-item, they, in most cases, want to pass some data to scripts, screens and outgoing messages for further processing. So the workflow wizard is designed from the point of view of data, and is thus called "data-oriented patterning". The workflow wizard thus enables an application developer to define an action or task, to specify attributes of the data and where the data is to flow, how it will be processed, used, displayed, etc. This workflow wizard therefore guides application developers through the process of defining the flow of work (from the perspective of data) and then automatically generates the code (the "action code") that is needed to implement or execute the action or task so that when the button is triggered (i.e. selected or "clicked") or the menu pulled down and the menu-item selected, the action code will execute and the application task will be performed.

Figure 2:
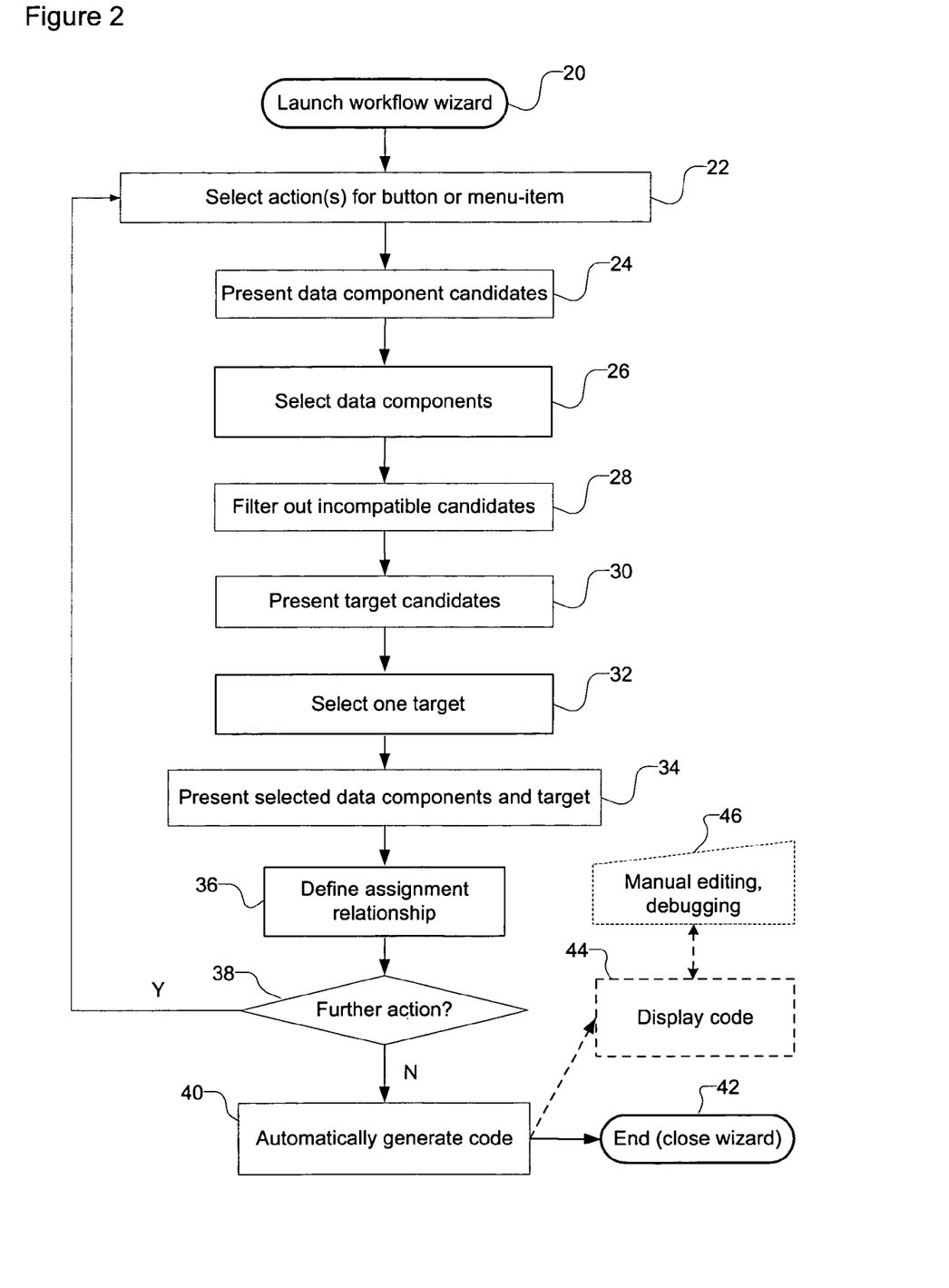
FIG. 2 is a flowchart illustrating a method of visually assisting an application developer with development of workflow for an application task in accordance with an embodiment of the present invention.

FIG. 2 shows a flowchart illustrating a method of visually assisting an application developer with development of workflow for an application task in accordance with a preferred embodiment of the present invention. As shown in FIG. 2, the method employs a workflow wizard to coordinate the programming of workflow.

As shown in FIG. 2, the application developer begins by launching the workflow wizard (step 20). As will be elaborated below, the workflow wizard graphically presents (on the GUI of the computing device, i.e. as a series of pages, screens, windows or dialog boxes) a sequence of options for programming or designing the workflow of the application task. As shown in FIG. 2, the first page (or window or dialog box or equivalent) is a tasking page (or action page) which prompts the application developer to select an action or task from the tasking/action page. On the tasking page (or action page), the application developer also can specify name and caption for a button (or "action button") or menu-item (step 22).

As further shown in FIG. 2, the workflow wizard then presents the application developer with a second page, namely a data selection page (step 24) from which the application developer can select desired data components from the data selection page, such as screen parameters, local variables, global variables, and the value of screen controls. The workflow wizard then prompts the application developer to select the desired data components from the candidate data components (step 26). Based on the selection of data components, the workflow wizard filters out incompatible object candidates (step 28) and then presents the application developer with candidate targets (step 30), such as messages, screens, and scripts. The developer can select one target for the required action (step 32). Subsequently, the workflow wizard presents an assignment page which displays the selected data components and the selected target (step 34). The assignment page allows the developer to define the assignment between data and target (step 36), that is the assignment page prompts the developer to specify the detailed assignment relationship between the selected data components and the fields of the selected target. If more actions need to be defined (step 38), the workflow wizard guides the developer through step 24 to step 36 again. Finally, after assignment is specified, the workflow wizard automatically generates code (step 40) that, when executed, will implement the programmed task.

After the code is auto-generated, the workflow wizard can close down (step 42), or display a code window (optional step 44), or enable manual editing/debugging of the code (optional step 46).

Figure 3:
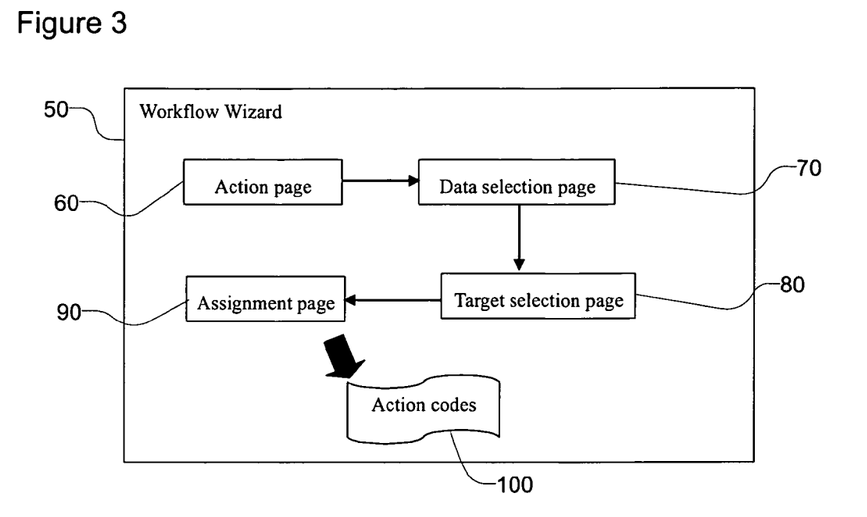
FIG. 3 schematically illustrates a framework of a workflow wizard in accordance with embodiments of the present invention.

FIG. 3 schematically illustrates a summary framework of the workflow wizard in accordance with embodiments of the present invention. The workflow wizard 50 graphically presents workflow-defining options in a sequence of pages that includes (i) an action page 60, also known as a "tasking page", which enables the application developer to define an action trigger for triggering execution of a task; (ii) a data selection page 70 that enables the application developer to select desired data components from a plurality of prescribed data component options; (iii) a target selection page 80 that enables the application developer to select a target from a plurality of prescribed target options; and (iv) an assignment page 90 enabling the application developer to assign selected data to a selected target. As shown in FIG. 3, the workflow wizard 50 then transfers the data-target assignments from the assignment page 90 to a code auto-generator for automatically generating action codes 100, i.e. an executable portion of code that is capable of accomplishing the task when executed.

For the purposes of this specification, the term "source" means the developers' data selection whereas the term "target" means the targeted object of this action, such as message, screen, and script.

Action Page

The action page 60 (also known as a tasking page) enables developers to define an action button (preferably with a representative icon) or a menu-item that, when triggered, will execute the code to accomplish the action or task. In other words, the tasking page enables the application developer to define an action trigger for triggering execution of a task. When a button or a menu-item is placed on the screen, an action page, such as the one shown in FIG. 4, allows developers to choose desired actions, such as:

Send a message

Transfer to another screen

Customize (i.e. custom-define) processing script

Figure 4:
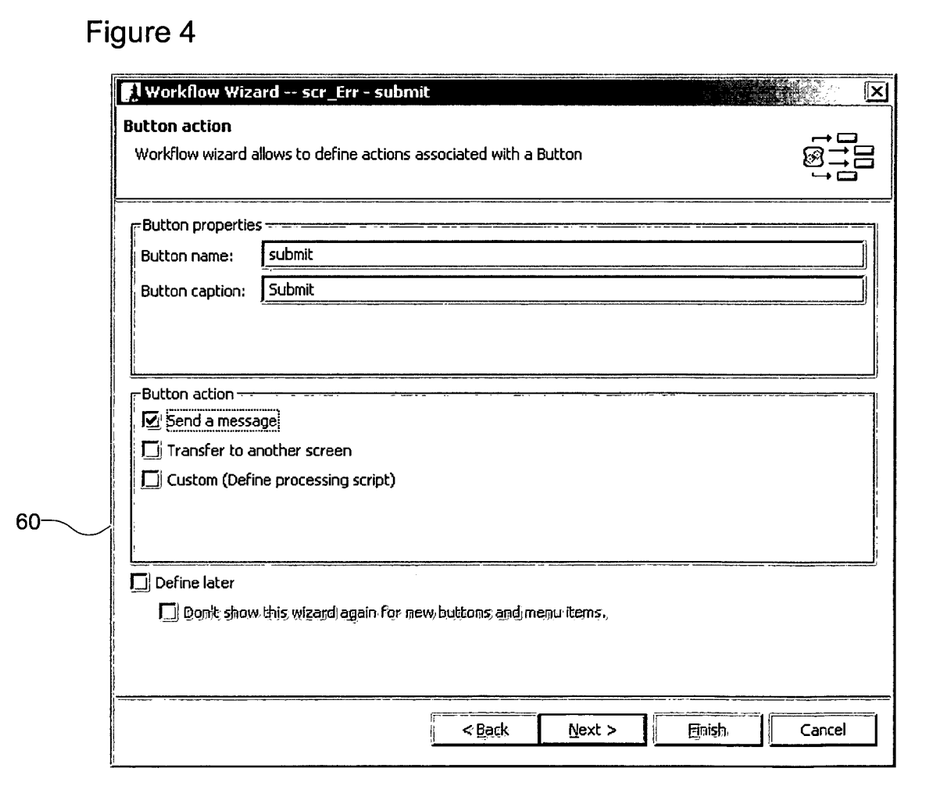
FIG. 4 illustrates a representative action page.

The action page will preferably also provide developers with the option to define the action button or menu-item at a later time. For example, as shown in FIG. 4, the action page has a "Define later" box which the developer can select to define the action button/menu-item later during the process.

Data Selection Page

The workflow wizard 50 graphically presents a data selection page 70 to enable the application developer to select desired data components from a plurality of prescribed data component options. The data selection page 70 enables developers to select desired data to be passed to script, message, and screen objects.

Figure 5:
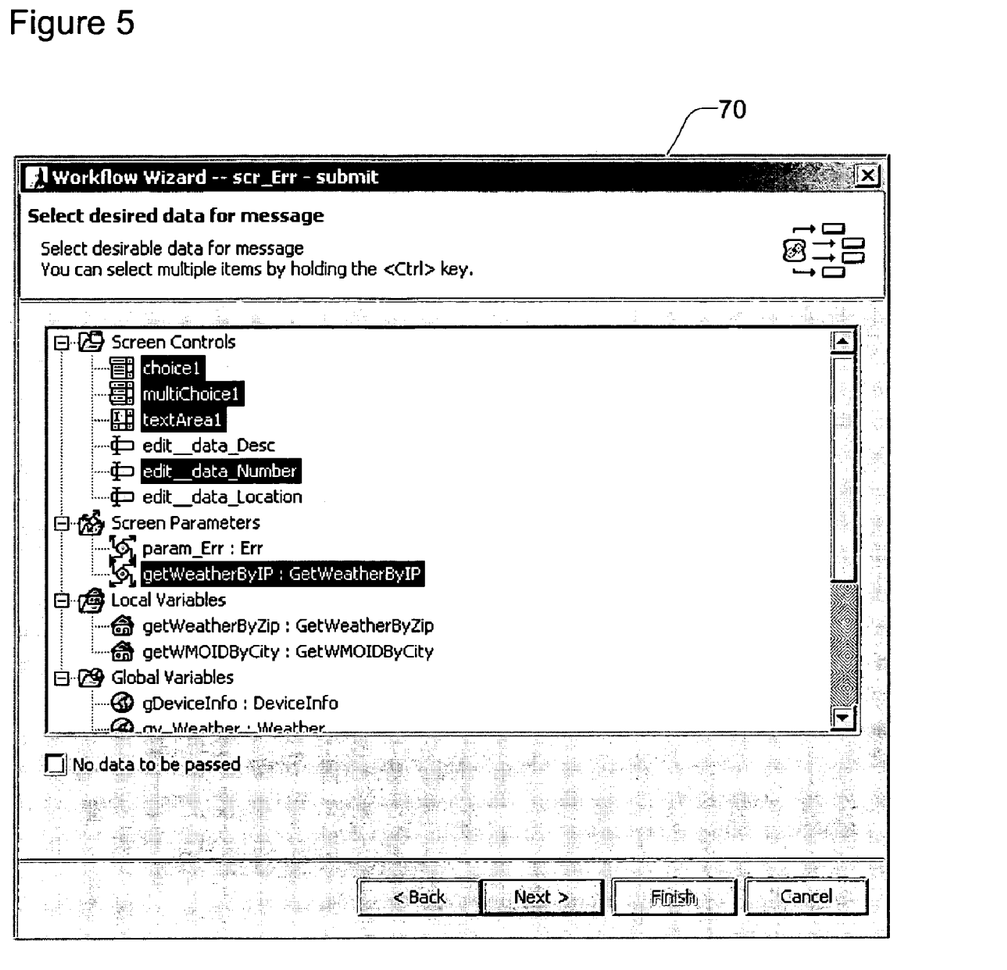
FIG. 5 illustrates a representative data selection page for programming a message-related aspect of a task.
Figure 6:
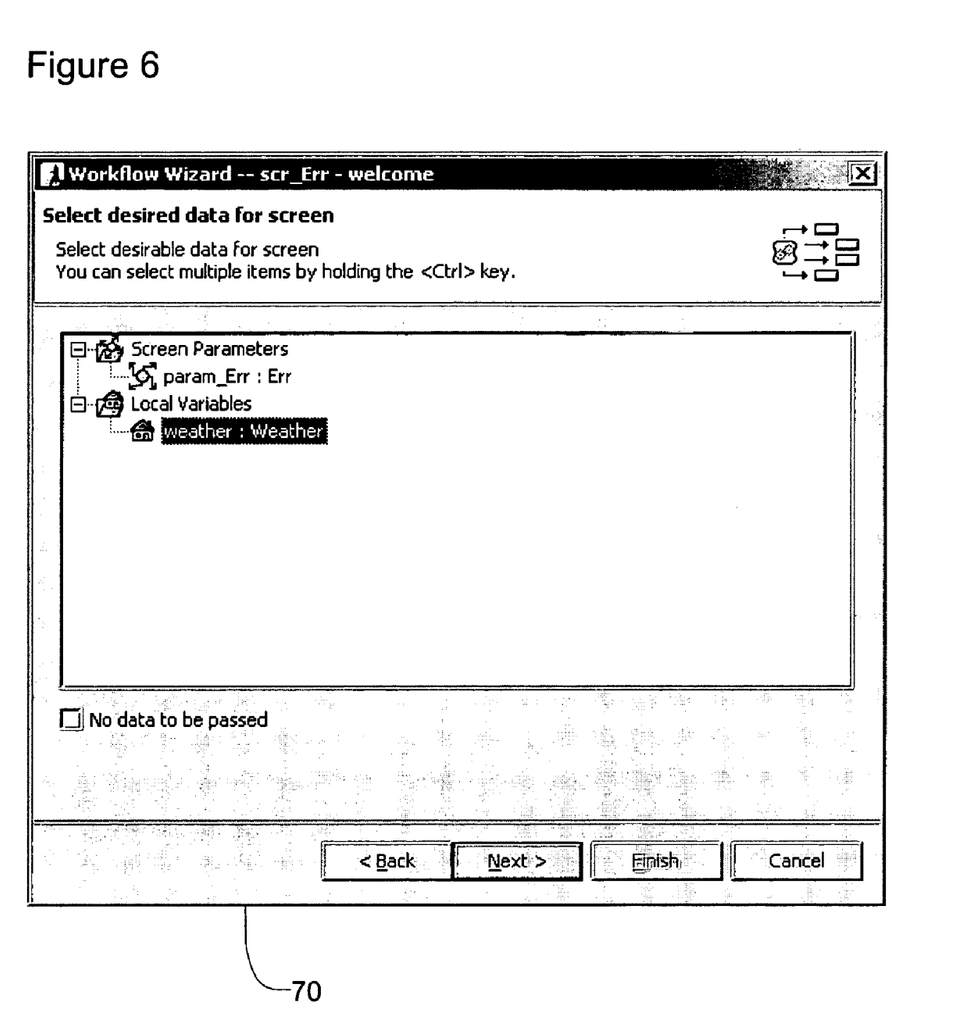
FIG. 6 illustrates a representative data selection page for programming a screen-related aspect of a task.

Due to intrinsic features of message, script and screen objects, the available data vary. For message objects, four types of data are available, screen control, screen parameters, local variables, and global variables, as shown by way of example in FIG. 5. For screen and script objects, two types of data are available, screen parameters, and local variables, shown by way of example in FIG. 6.

Preferably, the data selection page 70 further includes an option enabling the application developer to concurrently select a plurality of data components. Preferably, the data selection page 70 also includes functionality to allow the developer to choose not to select and pass on any data (such as by clicking on the box labelled "No data to be passed" in FIGS. 5 and 6).

Target Selection Page

The workflow wizard 50 graphically presents candidate targets on a "target selection page", which could also be termed an "object selection page". In this context, objects are effectively the "targets" of the source data by assigning data to the objects. Therefore, the target selection page displays available object candidates and enables the developer to select one of the candidate objects. The target selection page 80 intelligently filters out the object candidates that are incompatible with the selected data components and thus presents to the application developer only those qualified messages, screens, or scripts that are compatible with the pre-selected data components.

Figure 7:
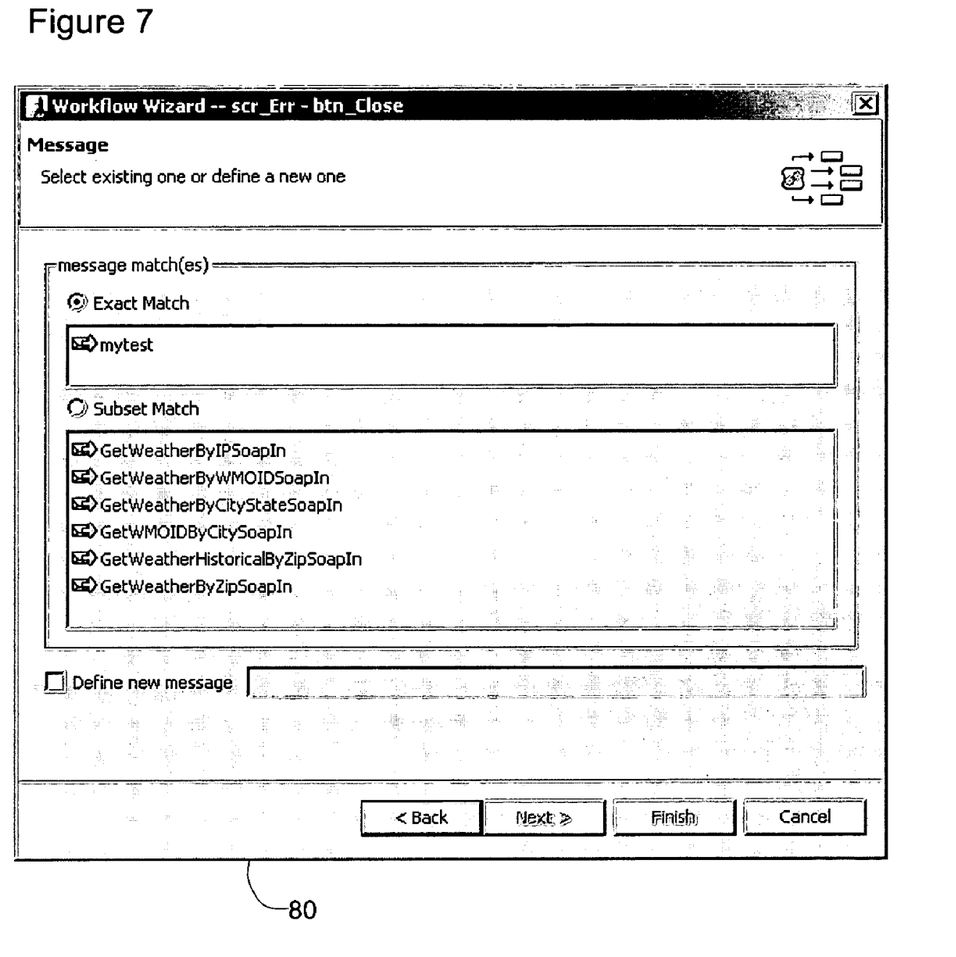
FIG. 7 illustrates a representative target selection page depicting the choosing of either exact or subset matching for a message-related aspect of a task.
Figure 8:
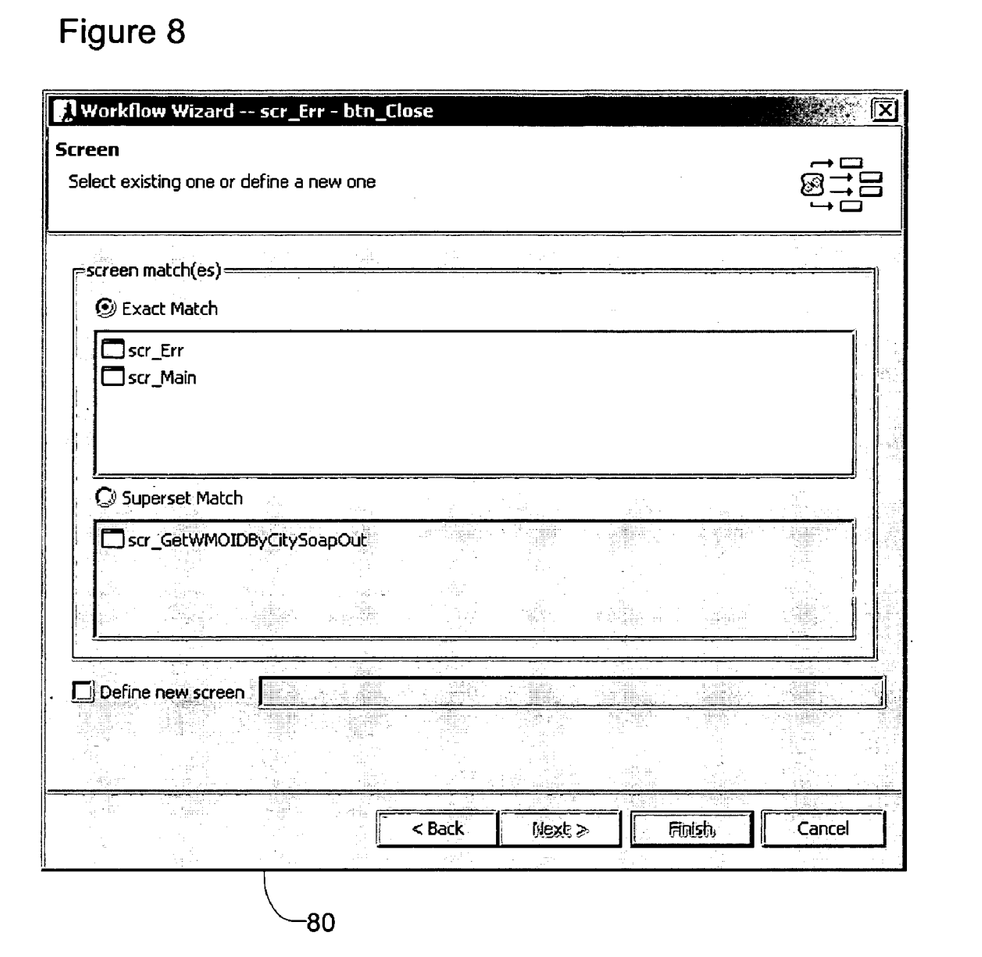
FIG. 8 illustrates a representative target selection page depicting the choosing of either exact or superset matching for a screen-related aspect of a task.

In the embodiment depicted in FIG. 7, which enables the developer to define message characteristics, the target selection page offers a choice of either exact matching or subset matching of data components and objects. In the embodiment depicted in FIG. 8, which enables the developer to define screen characteristics, the target selection page offers a choice of either exact matching or superset matching of data components and objects. For defining script characteristics, the target selection page would also offer a choice of either exact or superset matching.

For the purposes of this specification, exact, subset and superset matching are defined and implemented as follows:

Exact matching: means that source equals target. The exact matching algorithm is:
1. The number of selections in source must equal that of required fields in target.
2. The number of data types in source must equal that in target.
3. The categories of data types in source must equal that in target.
4. The number of references to each data type in source must equal that in target.

Subset matching: means that source is larger than target. The subset matching algorithm is:
1. The number of selections in source must be greater than that of required fields in target.
2. The number of data types in source must be equal or greater than that in target.
3. All categories of data types in target must be included in source.
4. The number of references to each data type in source must be equal to or greater than that in target.

Superset matching: means that source is less than target. The superset matching algorithm is:
1. The number of selections in source must be less than that of required fields in target.
2. The number of data types in source must be equal or less than that in target.
3. All categories of data types in source must be included in target.
4. The number of references to each data type in source must be equal to or less than that in target.

For message characteristics, exact matching and subset matching are available, as shown by way of example in FIG. 7. For screen and script characteristics, exact matching and superset machining are available, shown by way of example in FIG. 8.

Developers can also ignore these candidates and instead ask the workflow wizard to create a new message, screen, or script based on their data selection. For example, as shown in FIG. 7, the message characteristics page (or message page for short) provides a box labelled "Define new message". Similarly, the screen characteristics page (or screen page for short) exemplified by FIG. 8 contains a box labelled "Define new screen".

Assignment Page

Figure 9:
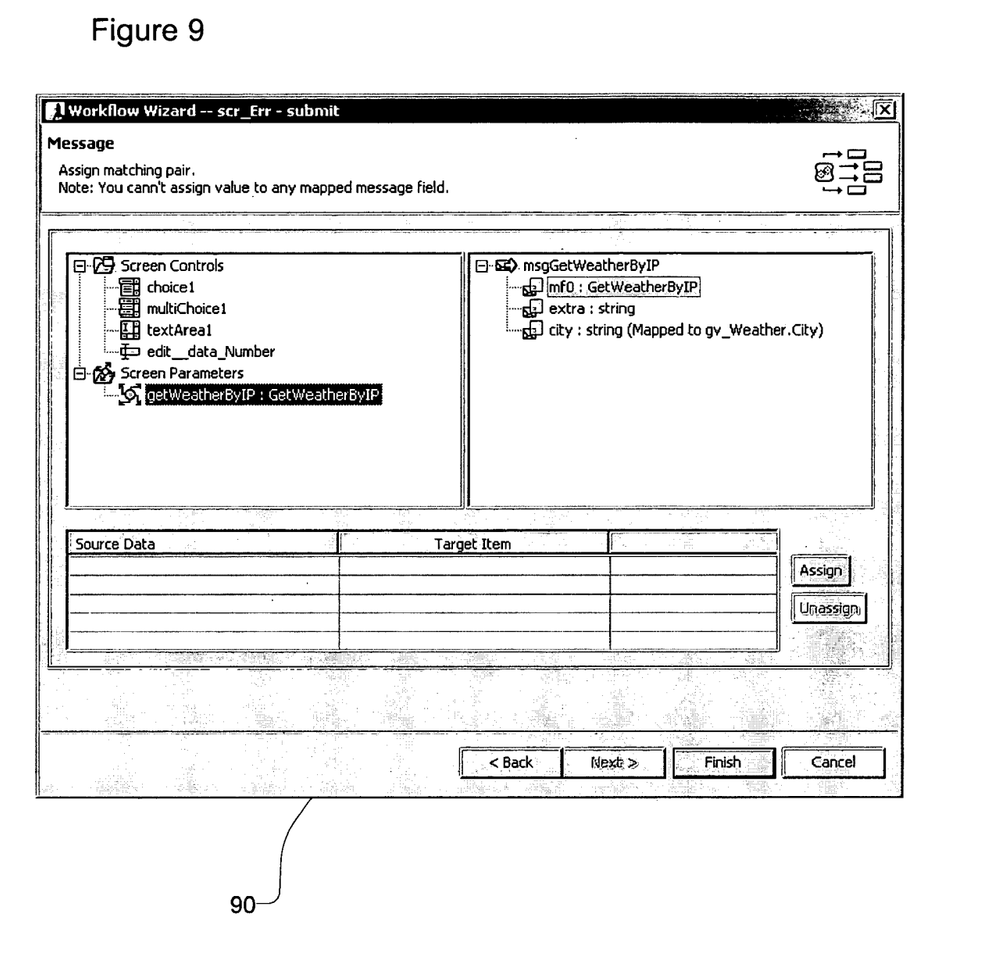
FIG. 9 illustrates a representative assignment page for assigning selected data components (denoted "source data") to selected target (denoted "target object").

Subsequent to the steps of selecting desired data and target, the workflow wizard 50 then presents the application developer with an assignment page 90 that functions as a visual tool to enable the developer to specify the detailed assignment relationship between source data and target, as shown by way of example in FIG. 9.

Preferably, the assignment page includes functionality to enable developers to easily assign and unassign the source data to the target.

Samples of Auto-Generated Codes

After guiding the developer through the above-described pages, the workflow wizard automatically generates action codes 100 for the specified action button or menu-item. In other words, the auto-generator automatically generates a piece of code that will perform the defined task when the code is executed. The code is executed by triggering the task. The task is launched, for example, by clicking the action button/icon or pulling down a menu and selecting the menu-item within the application. Since the code auto-generator automatically generates code that is free of syntactical errors and misspellings, the application developer saves a great deal of time and energy in developing an application or an update. Therefore, many routine tasks can be coded very quickly and efficiently using this invention. The workflow wizard effectively liberates the application developer from the minutiae and mechanics of coding and thus allows the developer to focus on application logic, efficient workflow and interface ergonomics rather than worrying about syntax, variable definitions and coding consistency.

What follows are a couple of examples of automatically generated code for tasks whose workflow was programmed using the workflow wizard. It should be clearly understood that these code listings are merely examples of specific tasks and are therefore not meant to limit the invention in any way. In other words, and for greater certainty, the workflow wizard can be used to design workflow and automatically generate code for any task or action for any wireless application or for any other, non-wireless software application.

List 0-1 is an example of auto-generated code that sends a message.

```
// BEGIN Generated script: generated: 28-Jan-2005 02:26:30 PM.
// Assign message fields.
mytest.mf0 = scr_Err.edit_data_Number.value;
mytest.mf1 = getWeatherByZip1;
mytest.mf2 = Err;
mytest.mf3 = Weather;
mytest.mf4 = scr_Err.edit_data_Desc.value;
mytest.mf5 = newArray( );
var selectedIndex;
for(var i=0; i<scr_Err.multiChoice1.selected.length; i++) {
    selectedIndex = scr_Err.multiChoice1.selected[i];
    mytest.mf5.push(scr_Err.multiChoice1.value[selectedIndex]);
}
// send message: mytest
mytest.send( );
// END Generated script: generated: 28-Jan-2005 02:26:30 PM.
```

List 0-1: Auto-generated code to send a message

List 0-2 is an example of auto-generated code that sends a message and transfers to another screen.

```
// BEGIN Generated script: generated: 28-Jan-2005 02:31:03 PM.
// Assign message fields.
outGetWeatherByZipSoapIn.parameters = getWeatherByZip2;
// send message: outGetWeatherByZipSoapIn
outGetWeatherByZipSoapIn.send( );
// transition to screen: scr_MessageSent
scr_MessageSent.display(getWeatherByZip2);
// END Generated script: generated: 28-Jan-2005 02:31:03 PM.
```

List 0-2: Auto-generated code to send a message and transfer to another screen

Once the code is auto-generated, as was mentioned earlier, the workflow wizard can optionally provide the application developer with the opportunity to manually edit, test and debug the auto-generated code.

While a "wizard" is the preferred mode of implementing the present invention, it should be expressly understood that the methods and systems of the present invention need not be implemented in the form a "wizard" per se. For example, the methods of enabling assisted visual application development could be implemented in a logically apparent series of pull-down menus or a sequence of buttons/icons that are launched in a clear sequence. Furthermore, it should be appreciated that while it is preferable for data-oriented patterning to begin by selecting data components, the objects could, in some situations be selected first. Therefore, the order of selections should not be construed as being essential.

The embodiments of the invention described above are intended to be exemplary only. The scope of the invention is therefore intended to be limited solely by the appended claims.

A portion of the disclosure of this patent document may contain material that is subject to copyright protection. The copyright owner has no objection to the facsimile reproduction by anyone of the patent document or patent disclosure, as it appears in the Patent and Trademark Office patent file or records, but otherwise reserves all copyright.

We claim:

1. A method in an application development environment (ADE), of enabling assisted visual development of workflow, for a wireless application action for execution on a wireless device, the method comprising sequentially:

providing an action page from which a user of the ADE can select a desired one of a plurality of candidate actions that can be executed on the wireless device;

providing a data selection page from which the user of the ADE can select a desired set of data components from a plurality of candidate data components to be available to the wireless device;

providing a target selection page from which the user of the ADE can select a desired one of a plurality of candidate targets, the providing the target selection page comprising filtering out the targets that are not compatible with selected data components and displaying only the targets that are compatible with the selected data components wherein the filtering comprises providing a choice of either exact or subset matching of data components and targets for messages and a choice of either exact or superset matching of data components and targets for screens and scripts;

providing an assignment page adapted to enable the user of the ADE to assign the selected set of data components to fields of the selected target;

generating one or more action codes to implement the selected action using the selected set of data components and the selected target for execution on the wireless device;

generating application logic for execution on a wireless device based upon the one or more generated action codes;

uploading one or more action codes generated from the ADE to an application gateway (AG) whereby the one or more action codes can be downloaded by the wireless device for execution; and uploading application logic from the ADE to the AG to facilitate execution of the one or more action codes on the wireless device.

2. The method as claimed in claim 1 wherein providing the action page comprises providing a selection of candidate actions that include sending a message, transferring data to another screen, and customizing a definition of a processing script.

3. The method as claimed in claim 1 wherein providing the data selection page comprises providing an option to define a new data component.

4. The method as claimed in claim 1 wherein providing the target selection page comprises providing an option to define a new target.

5. A system for visually assisting an application developer with development of workflow for wireless application task for execution on a plurality of wireless devices, the system comprising:

a computing device for exchanging data through a data network with an applications gateway (AG) which mediates between the data network and a wireless network serving the plurality of wireless devices;

an application development environment (ADE) running on the computing device, the ADE comprising:

a workflow wizard for visually assisting the application developer with the development of workflow for executing the application task by graphically and sequentially presenting the options in a sequence of pages comprising:

a tasking page to enable the application developer to define an action trigger for triggering execution of a task;

a data selection page to enable the application developer to select desired data components from a plurality of prescribed data component options; and a target selection page to enable the application developer to select a target from a plurality of prescribed target options, the target selection page configured to display only targets that are determined to be compatible with selected data components as a result of filtering which comprises providing a choice of either exact or subset matching of data components and targets for messages and a choice of either exact or superset matching of data components and targets for screens and scripts;

an assignment page enabling the application developer to assign selected data to the selected target; and an auto-generator for generating executable code for execution on the plurality of wireless devices based upon the selected data and the target options defining the workflow;

wherein generated code is uploaded from the computing device to the AG enabling the plurality of wireless devices to download the executable code and application logic is uploaded from the computing device to the AG to facilitate execution of the executable code on the wireless device.

6. The system as claimed in claim 5 wherein the data selection page further comprises an option to define a new data component.

7. The system as claimed in claim 5 wherein the target selection page further comprises an option to define a new object.

8. The system as claimed in claim 5 wherein the workflow wizard graphically presents a data dialog box presenting data component options and then a target dialog box presenting target options determined by the data component selected in the data dialog box.

9. A method in an application development environment (ADE), of visually assisting with programming of workflow for a wireless application task, for execution on a wireless device, the method comprising sequentially:

providing a task page from which a user of the ADE can select a desired task from a plurality of candidate tasks, that can be executed on the wireless device;

providing a data selection page from which the user of the ADE can select at least one data component from a plurality of candidate data components available to the wireless terminal device;

providing a target selection page from which the user of the ADE can select a desired object from a plurality of candidate objects;

providing an assignment page to enable the user of the ADE to assign the at least one data component that was selected from the data selection page to fields of the selected object;

generating code to execute the task using the selected set of data components and the assigned fields of the selected object for the execution on the wireless device;

generating application logic for execution on a wireless device based upon the generated tasks;

uploading the one or more tasks from the ADE to an application gateway (AG) whereby the code to execute the task can be downloaded by the wireless terminal device; and uploading application logic from the ADE to the AG to facilitate execution of the task on the wireless device, wherein providing the target selection page further comprises:

providing a choice of exact matching or subset matching for message data components and message objects to the user of the ADE;

providing a choice of exact matching or superset matching for screen data components and screen objects as well as, script data components and script objects to the user of the ADE; and wherein the number of data component selections is compared to the number of fields of the selected objects, the number and categories of data types of the selected data components is compared to the number and categories of data types defined for the selected objects, and the amount of reference to each data type in the data selections is compared to the amount of reference to each data type in the objects.

10. The method as claimed in claim 9 wherein providing the data selection page comprises providing an option to define a new data component.

11. The method as claimed in claim 9 wherein providing the target selection page comprises providing an option to define a new object.

12. The method as claimed in claim 9 wherein providing the target selection page comprises displaying a selection of objects that have been filtered for compatibility with selected data components.

13. The method as claimed in claim 9 further comprising providing a message characteristics page that provides a choice of either exact matching or subset matching of data components and objects.

14. The method as claimed in claim 9 further comprising providing a screen characteristics page that provides a choice of either exact matching or superset matching of data components and objects.

15. The method as claimed in claim 9 further comprising providing a script customization page that provides a choice of either exact matching or superset matching of data components and objects.

* * * * *